United States Patent
Kim et al.

(10) Patent No.: US 11,427,736 B2
(45) Date of Patent: Aug. 30, 2022

(54) SUBSTRATE-FREE TRANSFER TAPE

(71) Applicant: LG Chem, Ltd., Seoul (KR)

(72) Inventors: Ji Hye Kim, Daejeon (KR); Ki Seung Seo, Daejeon (KR); Jun Hyoung Park, Daejeon (KR); Jang Soon Kim, Daejeon (KR); Kyung Jun Yoon, Daejeon (KR)

(73) Assignee: LG Chem, Ltd.

( * ) Notice: Subject to any disclaimer, the term of this patent is extended or adjusted under 35 U.S.C. 154(b) by 97 days.

(21) Appl. No.: 16/334,238

(22) PCT Filed: Feb. 9, 2018

(86) PCT No.: PCT/KR2018/001773
§ 371 (c)(1),
(2) Date: Mar. 18, 2019

(87) PCT Pub. No.: WO2018/147686
PCT Pub. Date: Aug. 16, 2018

(65) Prior Publication Data
US 2019/0382624 A1    Dec. 19, 2019

(30) Foreign Application Priority Data
Feb. 10, 2017 (KR) .................. 10-2017-0018892

(51) Int. Cl.
*C09J 7/40* (2018.01)
*C09J 7/38* (2018.01)
(Continued)

(52) U.S. Cl.
CPC .................. *C09J 7/40* (2018.01); *B32B 27/08* (2013.01); *C09J 7/385* (2018.01); *C09J 11/06* (2013.01);
(Continued)

(58) Field of Classification Search
None
See application file for complete search history.

(56) References Cited

U.S. PATENT DOCUMENTS

2008/0118693 A1* 5/2008 Bilski .................. C09J 7/20
428/41.8
2010/0230036 A1 9/2010 Habu et al.
(Continued)

FOREIGN PATENT DOCUMENTS

CN 101831253 A 9/2010
CN 102666763 A 9/2012
(Continued)

OTHER PUBLICATIONS

Extended European Search Report for Application No. 18750994.8 dated Nov. 7, 2019.
(Continued)

*Primary Examiner* — Frank D Ducheneaux
(74) *Attorney, Agent, or Firm* — Lerner, David, Littenberg, Krumholz & Mentlik, LLP

(57) ABSTRACT

Provided is a substrate-free transfer tape including: a release liner including a heavy peel surface and a light peel surface; and a transfer film layer provided on the heavy peel surface, in which release peel force between the heavy peel surface and the transfer film layer is from 10 g/in to 70 g/in or less at the time of peeling the transfer film layer at a rate of 3 m/min.

8 Claims, 3 Drawing Sheets

(51) Int. Cl.
*C09J 11/06* (2006.01)
*C09J 133/08* (2006.01)
*C09J 133/10* (2006.01)
*C09J 133/26* (2006.01)
*B32B 27/08* (2006.01)

(52) U.S. Cl.
CPC .......... *C09J 133/08* (2013.01); *C09J 133/10* (2013.01); *C09J 133/26* (2013.01); *C09J 2301/12* (2020.08); *C09J 2301/312* (2020.08); *C09J 2301/408* (2020.08)

(56) References Cited

U.S. PATENT DOCUMENTS

| | | | |
|---|---|---|---|
| 2010/0239859 A1 | 9/2010 | Song et al. | |
| 2011/0076489 A1 | 3/2011 | Nonaka et al. | |
| 2012/0219796 A1* | 8/2012 | Igarashi ................. | C09J 7/381 428/355 EN |
| 2012/0225997 A1 | 9/2012 | Niwa et al. | |
| 2012/0276378 A1* | 11/2012 | Okamoto ........... | C08G 18/8029 428/354 |
| 2013/0295329 A1 | 11/2013 | Araki | |
| 2016/0096980 A1 | 4/2016 | Wieneke et al. | |
| 2017/0253770 A1 | 9/2017 | Nam et al. | |

FOREIGN PATENT DOCUMENTS

| | | |
|---|---|---|
| CN | 103360958 A | 10/2013 |
| CN | 103360965 A | 10/2013 |
| CN | 103403115 A | 11/2013 |
| CN | 103865409 A | 6/2014 |
| CN | 205133491 U | 4/2016 |
| JP | 2006348145 A | 12/2006 |
| JP | 2008143104 A | 6/2008 |
| KR | 20110006789 A | 1/2011 |
| KR | 20110064946 A | 6/2011 |
| KR | 20110075620 A | 7/2011 |
| KR | 20130078388 A | 7/2013 |
| KR | 20130143087 A | 12/2013 |
| KR | 101460553 B1 | 11/2014 |
| KR | 20150120292 A | 10/2015 |
| KR | 20160010545 A | 1/2016 |
| KR | 20160027501 A | 3/2016 |
| KR | 20160035704 A | 4/2016 |
| KR | 20160086427 A | 7/2016 |

OTHER PUBLICATIONS

International Search Report for PCT/KR2018/001773, dated May 16, 2018.
Chinese Search Report for Application No. 201880003829.3, dated Apr. 12, 2021, 9 pages.
Chinese Search Report for Application 2018800038.29.3 dated Nov. 3, 2020.

* cited by examiner

[Figure 1]
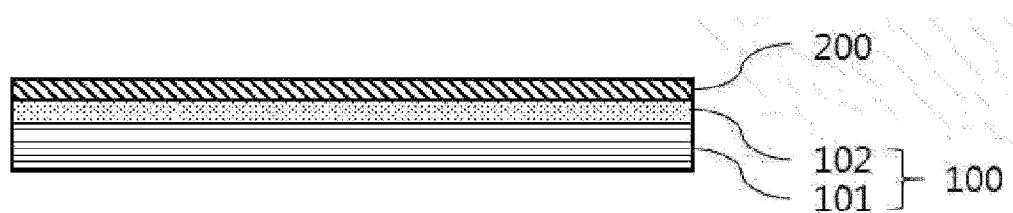

[Figure 2]
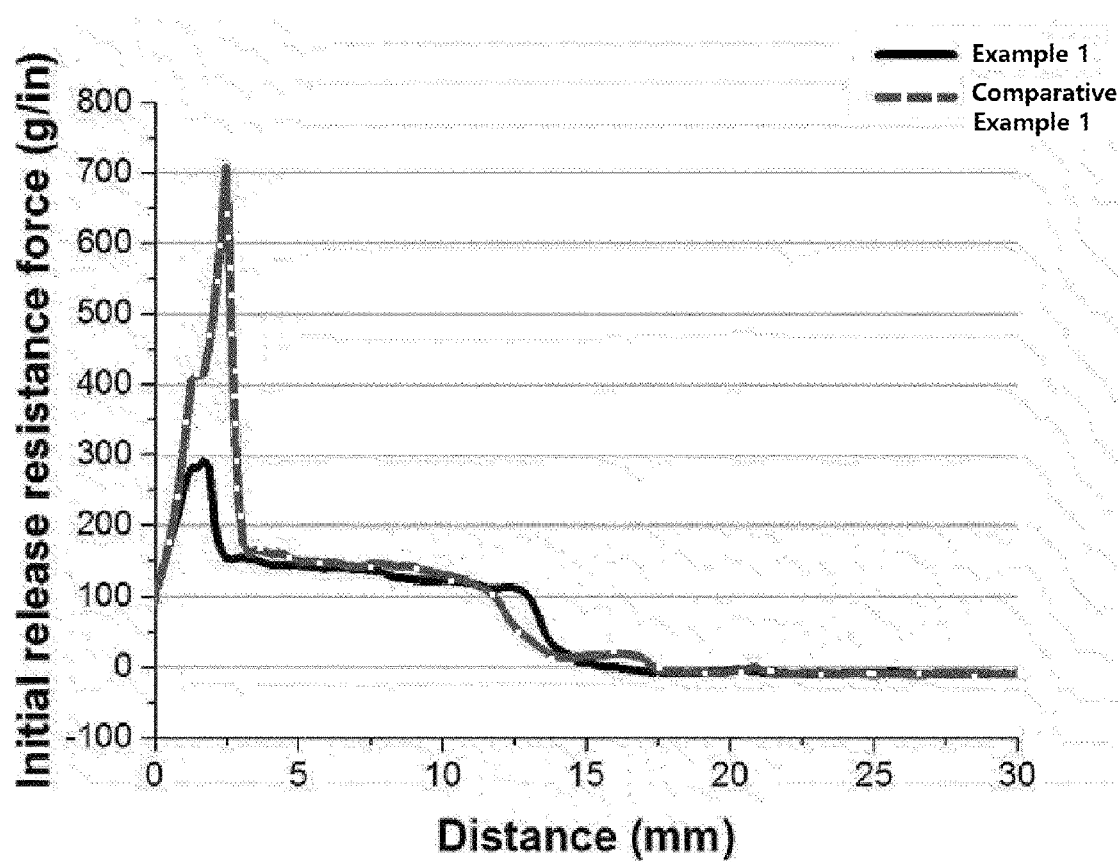

[Figure 3]
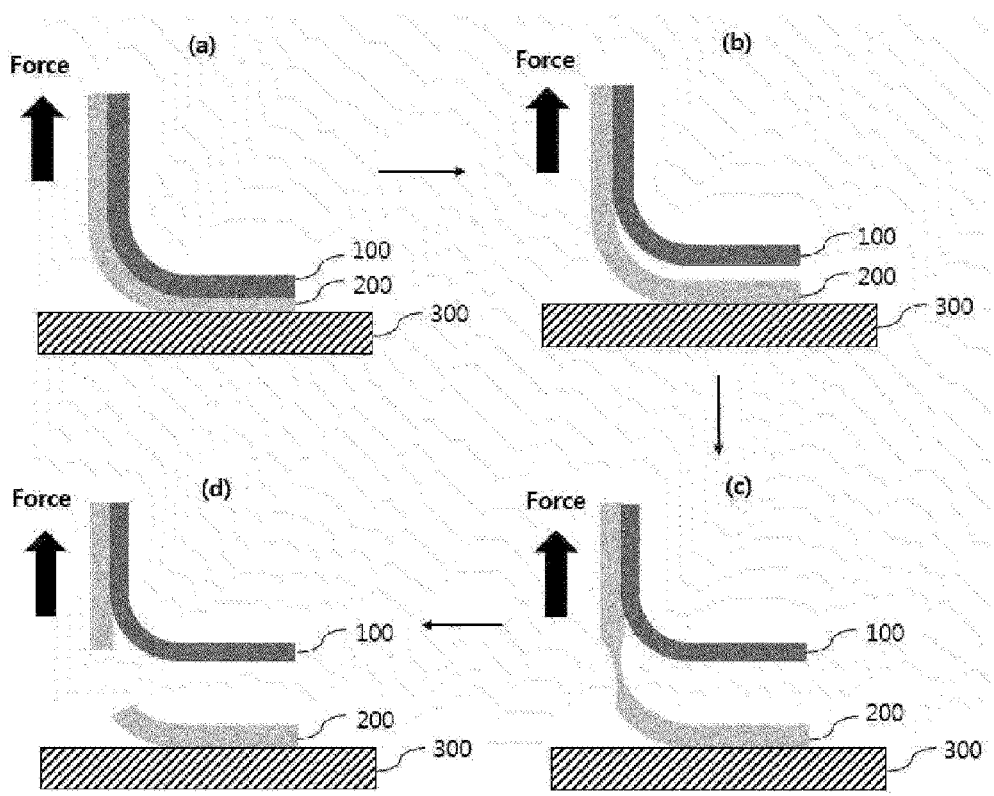

SUBSTRATE-FREE TRANSFER TAPE

CROSS-REFERENCE TO RELATED APPLICATIONS

The present application is a national phase entry under 35 U.S.C. § 371 of International Application No. PCT/KR2018/001773 filed on Feb. 9, 2018, which claims priority to Korean Patent Application No. 10-2017-0018892 filed on Feb. 10, 2017, the entire contents of which are incorporated herein by reference.

TECHNICAL FIELD

The present invention relates to a substrate-free transfer tape.

BACKGROUND ART

Various members are attached to an electronic device by an adhesive agent. For example, various optical members such as a polarizing plate, a phase difference plate, an optical compensation film, a reflection sheet, a protection film, and a brightness-enhancing film may be attached to a liquid crystal display (LCD) by an adhesive agent. Recently, as the thickness of the electronic device becomes small, efforts to implement excellent durability while reducing the thickness of an adhesive layer for attaching members in the electronic device have been continuously made.

When a substrate is not used in order to reduce the thickness of the adhesive layer, it is difficult to perform a continuous process because it is difficult to control dimensions through a stamping process and control a phenomenon in which the adhesive layer is lifted up from an adhered.

PRIOR ART DOCUMENT

Korean Patent Application Laid-Open No. 10-2011-0006789 A

DETAILED DESCRIPTION OF THE INVENTION

Technical Problem

The present specification has been made in an effort to provide a substrate-free transfer tape suitable for a continuous process.

Technical Solution

An exemplary embodiment of the present invention provides a substrate-free transfer tape including: a release liner including a heavy peel surface and a light peel surface; and a transfer film layer provided on the heavy peel surface, in which release peel force between the heavy peel surface and the transfer film layer is from 10 g/in to 70 g/in at the time of peeling off the transfer film layer at a rate of 3 m/min.

Advantageous Effects

A substrate-free transfer tape according to the present invention has an advantage in that work can be performed through a continuous process without a separate stamping process.

The substrate-free transfer tape according to the present invention has an advantage in that the tape may attach members of an electronic device with a minimum thickness.

The substrate-free transfer tape according to the present invention has an advantage in that the tape may be attached to an adherend without being lifted up from the adhered during a continuous process because the initial release resistance force of a transfer film layer is low.

The substrate-free transfer tape according to the present invention has an advantage in that the tape induces breakage of a transfer film layer through tension, and thus a continuous process may be carried out without a separate stamping process.

BRIEF DESCRIPTION OF DRAWINGS

FIG. 1 illustrates a substrate-free transfer tape according to an exemplary embodiment of the present invention.

FIG. 2 is a graph obtained by measuring initial release resistance force of transfer film layers in the substrate-free transfer tapes according to Example 1 and Comparative Example 1.

FIG. 3 illustrates a method for measuring initial release resistance force of a transfer film layer.

BEST MODE

When one member is disposed "on" another member in the present specification, this includes not only a case where the one member is brought into contact with another member, but also a case where still another member is present between the two members.

When one part "includes" one constituent element in the present specification, unless otherwise specifically described, this does not mean that another constituent element is excluded, but means that another constituent element may be further included.

Hereinafter, the present specification will be described in more detail.

An exemplary embodiment of the present invention provides a substrate-free transfer tape including: a release liner including a heavy peel surface and a light peel surface; and a transfer film layer provided on the heavy peel surface, in which release peel force between the heavy peel surface and the transfer film layer is from 10 g/in to 70 g/in at the time of peeling off the transfer film layer at a rate of 3 m/min.

The transfer film layer may be a substrate-free double-sided adhesive layer when the transfer film layer is transferred to an adhered, and the release liner is removed. The transfer film layer does not have a separate substrate, and thus has an advantage in that the layer may attach members of an electronic device with a minimum thickness.

FIG. 1 illustrates a substrate-free transfer tape according to an exemplary embodiment of the present invention. Specifically, FIG. 1 illustrates that a transfer film layer 200 is provided on a release liner 100 including a light peel surface 101 and a heavy peel surface 102. When the substrate-free transfer tape according to an exemplary embodiment of the present invention is provided in a wound form, an upper surface of the transfer film layer 200 may be wound while being brought into contact with the light peel surface 101 of the release liner 100. However, the substrate-free transfer tape according to the present invention is not limited to that in FIG. 1, and an additional member such as a substrate film provided between the light peel surface and the heavy peel surface may be further provided.

In the present specification, the heavy peel surface may mean a surface of the release liner brought into contact with the transfer film layer when the transfer tape is unwound. In the present specification, the light peel surface may mean a surface opposite to the surface of the release liner brought into contact with the transfer film layer when the transfer tape is unwound.

According to an exemplary embodiment of the present invention, release peel force between the heavy peel surface and the transfer film layer may be 65 g/in or less, 50 g/in or less, or 48 g/in or less at the time of peeling off the transfer film layer at a rate of 3 m/min. Further, according to an exemplary embodiment of the present invention, the release peel force between the heavy peel surface and the transfer film layer may be 20 g/in or more, 30 g/in or more, or 40 g/in or more at the time of peeling off the transfer film layer at a rate of 3 m/min.

The substrate-free transfer tape has an advantage in that it is possible to minimize a phenomenon in which the transfer film layer is lifted up from an adhered at the time of removing the release liner after attaching the transfer film layer to the adherend, by adjusting the release peel force between the heavy peel surface and the transfer film layer within the range. Specifically, the substrate-free transfer tape may minimize a phenomenon in which the transfer film layer is lifted up from the adhered at the time of removing the release liner after attaching the transfer film layer to the adherend, by adjusting the release peel force between the transfer film layer and the heavy peel surface of the release liner at a very low level as in the range.

According to an exemplary embodiment of the present invention, the initial release resistance force of the transfer film layer may be from 200 g/in to 600 g/in. Preferably, according to an exemplary embodiment of the present invention, the initial release resistance force of the transfer film layer may be from 200 g/in to 550 g/in, or from 250 g/in to 550 g/in. More preferably, according to an exemplary embodiment of the present invention, the initial release resistance force of the transfer film layer may be from 280 g/in to 520 g/in, or from 290 g/in to 500 g/in.

When tensile force is applied in order to break a transfer film layer of a substrate-free transfer tape after attaching the transfer film layer to an adherend, the initial release resistance force may mean force when the transfer film layer begins to be stretched. That is, the transfer film layer can be broken only when force higher than the initial release resistance force is applied.

When the initial release resistance force of the transfer film layer is adjusted within the above range, the transfer film layer may be attached to the adherend through a continuous process. Specifically, when the initial release resistance force of the transfer film layer is adjusted within the above range, there is an advantage in that it is possible to minimize a phenomenon in which the transfer film layer attached to the adherend is lifted up when the transfer film layer is broken by applying tensile force after attaching the transfer film layer to the adherend. Furthermore, by using the aforementioned advantage, the substrate-free transfer tape may be applied to a continuous process, and the transfer film layer may be continuously attached to a plurality of adherends.

FIG. 3 illustrates a method for measuring initial release resistance force of a transfer film layer. Further, FIG. 3 may illustrate a procedure during a continuous process of the substrate-free transfer tape of the present invention. Specifically, FIG. 3 illustrates that the initial release resistance force is measured by (a) attaching a substrate-free transfer tape such that the transfer film layer 200 is brought into contact with an adherend 300, and then (b) measuring force when the release liner 100 and the transfer film layer 200 are peeled off by applying force. Furthermore, when tensile force is continuously applied to the substrate-free transfer tape, the transfer film layer 200, which is not attached to the adherend 300, is stretched (c), and thereafter, the transfer film layer is cut off (d), so that the substrate-free transfer tape may carry out a continuous process on the next adherend.

According to an exemplary embodiment of the present invention, the release peel force of the heavy peel surface with respect to tesa 7475, which is a reference tape, may be from 20 g/in to 50 g/in at the time of peeling off the reference tape at a rate of 3 m/min. According to an exemplary embodiment of the present invention, the release peel force of the heavy peel surface with respect to tesa 7475, which is a reference tape, may be from 20 g/in to 40 g/in, or from 25 g/in to 35 g/in at the time of peeling off the reference tape at a rate of 3 m/min.

The release peel force of the heavy peel surface of the present specification with respect to tesa 7475, which is a reference tape, was measured as follows. Specifically, after a reference tape (tesa 7475) with a width of 25.4 mm×a length of 150 mm was attached to a heavy peel surface of a release liner by using and reciprocating a roller with a load of 2 kg twice at a rate of 10 mm/sec and aged for 24 hours in order to sufficiently attach the reference tape to the heavy peel surface of the release liner, peel strength at 180 degrees were measured at a rate of 3.0 m/min by using an AR-1000 apparatus (manufacturer: Cheminstrument Inc.).

According to an exemplary embodiment of the present invention, the heavy peel surface and the light peel surface of the release liner may be each a release layer formed by using a silicone-based release agent. However, the heavy peel surface and the light peel surface are not limited thereto, and may be a release layer formed by using a release agent typically used in the art.

According to an exemplary embodiment of the present invention, the release peel force between the transfer film layer and the heavy peel surface may be higher than release peel force between the transfer film layer and the light peel surface. Accordingly, the substrate-free transfer tape in a wound state may be easily unwound and applied to a continuous process.

According to an exemplary embodiment of the present invention, a substrate film of the release liner may be paper, a fiber sheet (woven fabric or non-woven fabric), or a polymer film. Specifically, according to an exemplary embodiment of the present invention, the substrate film of the release liner may be paper. When paper is used as the substrate film, costs may be reduced as compared to the case where a polymer film is used.

According to an exemplary embodiment of the present invention, the substrate-free transfer tape may be in a wound form. Specifically, the substrate-free transfer tape may be provided in the form of a wound roll, and a continuous process may be carried out on the substrate-free transfer tape through a continuous apparatus equipped with an unwinder.

According to an exemplary embodiment of the present invention, release peel force between the light peel surface and the transfer film layer may be 10 g/in or more and 25 g/in or less at the time of peeling off the transfer film layer at a rate of 3 m/min.

In the present specification, the release peel force between the light peel surface and the transfer film layer may be measured by the same procedure as in the above-described method for measuring the release peel force between the transfer film layer and the heave peel surface of the release liner.

When the substrate-free transfer tape is in a wound form, a surface opposite to the surface of the transfer film layer brought into contact with the heavy peel surface is brought into contact with the light peel surface of the release liner. When the release peel force between the light peel surface and the transfer film layer is within the above range, the transfer film layer may not be damaged when the substrate-free transfer tape in a wound form is applied to a continuous process through an unwinder, and the like. When the release peel force between the light peel surface and the transfer film layer exceeds 25 g/in, the release peel force balance with the heavy peel surface is not matched, so that there occurs a reverse peel phenomenon in which the adhesive agent is not smoothly detached from the light peel surface and remains on the light peel surface, and as a result, the adhesive agent is damaged, and when the substrate-free transfer tape is applied to a continuous process, machines may be contaminated.

According to an exemplary embodiment of the present invention, the transfer film layer may be a cured product of a resin composition including: a (meth)acrylate monomer; a cycloalkyl group-containing acrylate monomer; a heterocycloalkyl group-containing acrylate monomer; and a polar functional group-containing monomer.

According to an exemplary embodiment of the present invention, the transfer film layer may be a single layer. Specifically, the transfer film layer does not include a separate substrate film, and may be a single double-sided adhesive film layer.

In the present specification, the (meth)acrylate means acrylate or methacrylate.

According to an exemplary embodiment of the present invention, the cycloalkyl group may include a carbon ring structure in which an unsaturated bond is not present in the functional group, and may include a monocyclic ring or a polycyclic ring which has 3 to 20 carbon atoms.

According to an exemplary embodiment of the present invention, the heterocycloalkyl group may include a ring structure in which an unsaturated bond is not present in the functional group and a heteroatom other than carbon is included, and may include a monocyclic ring or a polycyclic ring which has 2 to 20 carbon atoms.

According to an exemplary embodiment of the present invention, the (meth)acrylate monomer may be a (meth) acrylate having an alkyl group having 1 to 20 carbon atoms. Preferably, the (meth)acrylate monomer may include one or more selected from the group consisting of methyl (meth) acrylate, ethyl (meth)acrylate, n-propyl (meth)acrylate, isopropyl (meth)acrylate, n-butyl (meth)acrylate, t-butyl (meth) acrylate, sec-butyl (meth)acrylate, pentyl (meth)acrylate, 2-ethylhexyl (meth)acrylate, 2-ethylbutyl (meth)acrylate, n-octyl (meth)acrylate, and isooctyl (meth)acrylate.

According to an exemplary embodiment of the present invention, the cycloalkyl group-containing acrylate monomer may include one or more selected from the group consisting of cyclohexyl acrylate (CHA), cyclohexyl methacrylate (CHMA), isobornyl acrylate (IBOA), isobornyl methacrylate (IBOMA), and 3,3,5-trimethyl cyclohexyl acrylate (TMCHA).

According to an exemplary embodiment of the present invention, a content of the cycloalkyl group-containing acrylate monomer may be from 10 parts by weight to 40 parts by weight based on 100 parts by weight of the (meth)acrylate monomer. Preferably, according to an exemplary embodiment of the present invention, the content of the cycloalkyl group-containing acrylate monomer may be from 10 parts by weight to 30 parts by weight based on 100 parts by weight of the (meth)acrylate monomer. Further, the content of the cycloalkyl group-containing acrylate monomer may be from 25 parts by weight to 30 parts by weight based on 100 parts by weight of the (meth)acrylate monomer.

When the content of the cycloalkyl group-containing acrylate monomer is within the above range, it is possible to secure attachment force of the transfer film layer with respect to an adherend having a low surface energy.

According to an exemplary embodiment of the present invention, the heterocycloalkyl group-containing acrylate monomer may include one or more selected from the group consisting of tetrahydrofurfuryl acrylate (THFA), tetrahydropyranyl acrylate (THPA), acryloyl morpholine, and cyclictrimethylol-propaneformalacrylate (CTFA).

According to an exemplary embodiment of the present invention, a content of the heterocycloalkyl group-containing acrylate monomer may be from 1 part by weight to 15 parts by weight based on 100 parts by weight of the (meth)acrylate monomer. Preferably, according to an exemplary embodiment of the present invention, the content of the heterocycloalkyl group-containing acrylate monomer may be from 5 parts by weight to 15 parts by weight based on 100 parts by weight of the (meth)acrylate monomer. Further, the content of the heterocycloalkyl group-containing acrylate monomer may be from 5 parts by weight to 10 parts by weight based on 100 parts by weight of the (meth)acrylate monomer.

When the content of the heterocycloalkyl group-containing acrylate monomer is within the above range, excellent adhesive force may be maintained by lowering a glass transition temperature (Tg) of the transfer film layer, and the wettability of the transfer film layer may be improved.

According to an exemplary embodiment of the present invention, the polar functional group-containing monomer may include one or more selected from the group consisting of a hydroxyl group-containing monomer, a carboxyl group-containing monomer, and a nitrogen-containing monomer.

According to an exemplary embodiment of the present invention, the hydroxyl group-containing monomer may be one or more selected from the group consisting of 2-hydroxyethyl (meth)acrylate, 2-hydroxypropyl (meth)acrylate, 4-hydroxybutyl (meth)acrylate, 6-hydroxyhexyl (meth) acrylate, 8-hydroxyoctyl (meth)acrylate, 2-hydroxyethyleneglycol (meth)acrylate, and 2-hydroxypropyleneglycol (meth)acrylate.

According to an exemplary embodiment of the present invention, the carboxyl group-containing monomer may be one or more selected from the group consisting of acrylic acid, methacrylic acid, 2-(meth)acryloyloxy acetic acid, 3-(meth)acryloyloxy propyl acid, 4-(meth)acryloyloxy butyl acid, an acrylic acid dimer, itaconic acid, and maleic acid.

According to an exemplary embodiment of the present invention, the nitrogen-containing monomer may be one or more selected from the group consisting of 2-isocyanatoethyl (meth)acrylate, 3-isocyanatopropyl (meth)acrylate, 4-isocyanatobutyl (meth)acrylate, (meth)acrylamide, N-vinylpyrrolidone, and N-vinylcaprolactam.

According to an exemplary embodiment of the present invention, a content of the polar functional group-containing monomer may be from 1 part by weight to 10 parts by weight based on 100 parts by weight of the (meth)acrylate monomer. Preferably, according to an exemplary embodiment of the present invention, the content of the polar functional group-containing monomer may be from 5 parts by weight to 10 parts by weight based on 100 parts by weight of the (meth)acrylate monomer.

When the content of the polar functional group-containing monomer is within the above range, the content may be adjusted within a range in which cohesive force of the transfer film layer is not excessively increased, and the transfer film layer is easily broken and thus can be applied to a continuous process. Further, when the content of the polar functional group-containing monomer is within the above range, there is also an advantage in that heat resistance may be secured. Specifically, when the content of the polar functional group-containing monomer is less than the range, there may occur a problem in that the high-temperature durability deteriorates.

According to an exemplary embodiment of the present invention, the resin composition may further include one or more crosslinking agents selected from the group consisting of an acrylate-based crosslinking agent, an isocyanate-based crosslinking agent, an epoxy-based crosslinking agent, an aziridine-based crosslinking agent, and a metal chelate crosslinking agent. Specifically, the resin composition may further include an aziridine-based crosslinking agent.

The crosslinking agent may produce a crosslinking network in the transfer film layer, thereby securing cohesive force of the transfer film layer and imparting heat resistance.

According to an exemplary embodiment of the present invention, the acrylate-based crosslinking agent may be one or more selected from the group consisting of butanediol diacrylate, pentanediol diacrylate, hexanediol diacrylate, ethylene glycol diacrylate, diethylene glycol diacrylate, triethylene glycol diacrylate, tetraethylene glycol diacrylate, propylene glycol diacrylate, dipropylene glycol diacrylate, and tripropylene diacrylate.

According to an exemplary embodiment of the present invention, the isocyanate-based crosslinking agent may be one or more selected from the group consisting of crosslinking agents produced by allowing at least one diisocyanate of tolylene diisocyanate, xylene diisocyanate, diphenylmethane diisocyanate, hexamethylene diisocyanate, isophorone diisocyanate, tetramethylxylene diisocyanate, and naphthalene diisocyanate to react with a polyol.

According to an exemplary embodiment of the present invention, the epoxy-based crosslinking agent may be one or more selected from the group consisting of ethylene glycol diglycidyl ether, triglycidyl ether, trimethylolpropane triglycidyl ether, N,N,N',N'-tetraglycidyl ethylenediamine, and glycerin diglycidyl ether.

According to an exemplary embodiment of the present invention, examples of the aziridine-based crosslinking agent include one or more selected from the group consisting of N,N'-toluene-2,4-bis(1-aziridine carboxamide), N,N'-diphenylmethane-4,4'-bis(1-aziridine carboxamide), triethylenemelamine, bisisoprothaloyl-1-(2-methylaziridine), tri-1-aziridinyl phosphine oxide, and N,N'-bismethylene iminoisophthalamide, but are not limited thereto.

According to an exemplary embodiment of the present invention, the metal chelate crosslinking agent may include acetyl acetone acetoacetic acid ethyl, or the like, in which one or two or more polyvalent metals such as aluminum, iron, zinc, tin, titanium, antimony, magnesium or vanadium are coordinated, but is not limited thereto.

According to an exemplary embodiment of the present invention, the resin composition may include the crosslinking agent in an amount of 0.01 part by weight to 5 parts by weight, preferably, 0.03 part by weight to 5 parts by weight, and more preferably, 0.1 part by weight to 5 parts by weight, based on 100 parts by weight of the (meth)acrylate monomer.

When the content of the crosslinking agent is within the above range, the crosslinking density in the transfer film layer is appropriately adjusted, so that cohesive force and heat resistance may be implemented at an appropriate level, and adhesive force of the transfer film layer may also be improved. Specifically, when the content of the crosslinking agent is less than 0.01 part by weight, the crosslinking density of the transfer film layer is extremely decreased, so that there may occur a problem in that cohesive force and heat resistance deteriorate, and when the content of the crosslinking agent exceeds 5 parts by weight, the crosslinking density of the transfer film layer is extremely increased, and so that the adhesion and wettability with respect to an adherend deteriorate, and as a result, there may occur a problem in that adhesive force is reduced.

According to an exemplary embodiment of the present invention, the resin composition may be a resin composition in which the monomers in the resin composition are solution-polymerized. Specifically, the resin composition may polymerize the monomers through thermal polymerization. Furthermore, the crosslinking agent is added to the solution-polymerized resin composition, and then a transfer film layer polymerized at a conversion rate of 99% or more may be formed through thermal curing.

According to an exemplary embodiment of the present invention, the resin composition may have a weight average molecular weight (Mw) of 750,000 g/mol to 3,000,000 g/mol. Preferably, the resin composition may have a weight average molecular weight of 750,000 g/mol to 1,750,000 g/mol. More preferably, the resin composition may have a weight average molecular weight of 850,000 g/mol to 1,600,000 g/mol. More preferably, the resin composition may have a weight average molecular weight of 1,200,000 g/mol to 1,700,000 g/mol.

In the present specification, the weight average molecular weight may be a polystyrene-converted value measured by gel permeation chromatography (GPC).

When the weight average molecular weight of the resin composition is adjusted within the above range, it is possible to prevent a peel phenomenon which may occur during a processing process after transferring the transfer film to an adhered. Further, it is possible to improve low-temperature workability of the transfer film layer, to prevent a bonding defect with an adherend such as a glass panel occurring due to curing shrinkage, and to implement excellent durability even when a working surface is shrunk or deformed by temperature, humidity, or the like.

According to an exemplary embodiment of the present specification, the resin composition may have a degree of dispersion of 5 to 15. Preferably, according to an exemplary embodiment of the present specification, the resin composition may have a degree of dispersion of 5 to 12, or 7 to 12. More preferably, according to an exemplary embodiment of the present specification, the resin composition may have a degree of dispersion of 10 or more and 12 or less, or 11 or more and 12 or less.

In the present specification, the value of degree of dispersion means a value obtained by dividing the weight average molecular weight (Mw) of the resin composition by a number average molecular weight (Mn).

When the degree of dispersion of the resin composition is within the above range, excellent wettability is secured, so that properties suitable for a continuous process may be secured because excellent attachment force of a transfer film layer to an adherend may be implemented and the breaking distance of the transfer film layer may be shortened. Furthermore, when the degree of dispersion of the resin composition is within the above range, high heat resistance may be secured, and the viscosity of the resin composition is reduced, so that blending and coating properties with an additive may be improved.

According to an exemplary embodiment of the present invention, the resin composition may additionally include an adhesive imparting resin from the viewpoint of adjusting the adhesive performance.

According to an exemplary embodiment of the present invention, the adhesive imparting resin may include one or more selected from the group consisting of a hydrocarbon-based resin or a hydrogen additive thereof; a rosin resin or a hydrogen additive thereof; a rosin ester resin or a hydrogen additive thereof; a terpene resin or a hydrogen additive thereof; a terpene phenol resin or a hydrogen additive thereof; and a polymerized rosin resin or a polymerized rosin ester resin. However, the adhesive imparting resin is not limited thereto, and may be used without limitation as long as the adhesive imparting resin is generally used in the art.

According to an exemplary embodiment of the present invention, a content of the adhesive imparting resin may be 1 part by weight or more and 100 parts by weight or less based on 100 parts by weight of the (meth)acrylate monomer.

When the content of the adhesive imparting resin is within the above range, it is possible to maximize improvement in compatibility and cohesive force of the transfer film layer. Specifically, when the weight ratio of the adhesive imparting resin is less than 1 part by weight, effects caused by the addition may be insignificant, and when the weight ratio exceeds 100 parts by weight, there is concern that effects of improving compatibility or cohesive force may deteriorate.

According to an exemplary embodiment of the present invention, the resin composition may additionally include one or more additives selected from the group consisting of an acrylic low-molecular weight material, an epoxy resin, a UV stabilizer, an antioxidant, a toning agent, a reinforcing agent, a filler, an antifoaming agent, a surfactant, and a plasticizer within a range not affecting the effects of the invention.

According to an exemplary embodiment of the present invention, the transfer film layer may have a thickness of 5 µm or more and 80 µm or less. Specifically, according to an exemplary embodiment of the present invention, the transfer film layer may have a thickness of 20 µm to 80 µm, or 20 µm to 70 µm, or 30 µm to 70 µm.

By adjusting the thickness of the transfer film layer within the above range, natural breakage and release stability may be implemented during a continuous process.

According to an exemplary embodiment of the present invention, the release liner may have a thickness of 50 µm to 200 µm. Preferably, according to an exemplary embodiment of the present invention, the release liner may be produced to have a thickness of 120 µm to 130 µm by using chemical pulp (CP) having a weight of 70 g. Within the above thickness range, the release liner may minimize cost burdens, and may be prevented from being torn when peeled off.

According to an exemplary embodiment of the present invention, the transfer film layer may be formed by curing the resin composition, and a method thereof is not particularly limited.

According to an exemplary embodiment of the present invention, the transfer film layer may be produced by applying the resin composition or a coating liquid, which is produced by using the same, onto an appropriate process substrate with a typical means such as a bar coater, and curing the resin composition or the coating liquid.

According to an exemplary embodiment of the present invention, the curing process may be carried out after sufficiently removing volatile components or bubble causing components such as reaction residues, which are included in the resin composition or the coating liquid. Accordingly, it is possible to prevent problems in that the crosslinking density, the molecular weight, or the like of an adhesive agent is extremely low, so that the elastic modulus of the adhesive agent is reduced, and bubbles present at the interface become large in a high temperature state, so that a scatter is formed inside of the adhesive agent.

Further, a method for curing the resin composition or the coating liquid is particularly limited, and for example, a coating layer may be cured by being appropriately subjected to a heating, drying or aging process, or the like.

MODE FOR INVENTION

Hereinafter, the present invention will be described in detail with reference to Examples for specifically describing the present invention. However, the Examples according to the present invention may be modified in various forms, and it is not interpreted that the scope of the present invention is limited to the Examples to be described below. The Examples of the present specification are provided for more completely explaining the present invention to the person with ordinary skill in the art.

Example 1

A resin composition having a weight average molecular weight of about 1,500,000, a degree of dispersion of 10.5, and a solid content of 21 wt % was produced by solution-polymerizing 28.6 parts by weight of isobornyl acrylate, 7.1 parts by weight of tetrahydrofurfuryl acrylate, and 7.1 parts by weight of acrylic acid, based on 100 parts by weight of 2-ethylhexyl acrylate, in a 1 L glass reactor. After 0.01 part by weight of an aziridine-based crosslinking agent was put into 100 parts by weight of the produced resin composition and the resulting mixture was sufficiently stirred, a transfer film layer having a thickness of 50 µm was produced by coating the mixture onto a silicone release polyethylene terephthalate (PET) film, and then drying the coated film in an oven at 100° C. for 3 minutes.

Furthermore, silicone release-coated Release Liners A to E were prepared by laminating the transfer film layer onto both surfaces of a paper substrate. Release peel force of Release Liners A to E with respect to reference tapes (tesa 7475) is shown as in the following Table 1. The unit of the release peel force in the following Table 1 is g/in.

TABLE 1

|  |  | Release Liner A | | Release Liner B | | Release Liner C | | Release Liner D | | Release Liner E | |
| --- | --- | --- | --- | --- | --- | --- | --- | --- | --- | --- | --- |
|  |  | Light peel surface | Heavy peel surface | Light peel surface | Heavy peel surface | Light peel surface | Heavy peel surface | Light peel surface | Heavy peel surface | Light peel surface | Heavy peel surface |
| Measurement rate | 0.3 m/min | 7.0 | 9.7 | 9.5 | 12.2 | 10.3 | 12.5 | 22.0 | 42.8 | 10.6 | 28.5 |
|  | 3.0 m/min | 12.7 | 29.0 | 12.8 | 32.3 | 13.6 | 31.3 | 56.1 | 100.5 | 15.3 | 65.2 |

After the prepared transfer film layer was laminated onto the heavy peel surface of Release Liner A, the silicone release polyethylene terephthalate (PET) film was peeled off and the transfer film layer was wound. And, a wound substrate-free transfer tape was produced by aging the transfer film layer in an oven at 50° C. for 48 hours.

Example 2

A wound substrate-free transfer tape was produced in the same manner as in Example 1, except that the transfer film layer was laminated onto the heavy peel surface of Release Liner B.

Example 3

A wound substrate-free transfer tape was produced in the same manner as in Example 1, except that the transfer film layer was laminated onto the heavy peel surface of Release Liner C.

Comparative Example 1

A wound substrate-free transfer tape was produced in the same manner as in Example 1, except that the transfer film layer was laminated onto the heavy peel surface of Release Liner D.

Comparative Example 2

A wound substrate-free transfer tape was produced in the same manner as in Example 1, except that the transfer film layer was laminated onto the heavy peel surface of Release Liner E.

Example 4

A transfer film layer was produced in the same manner as in Example 1, except that the thickness of the transfer film layer was adjusted to 75 μm. Furthermore, after the transfer film layer was laminated onto Release Liner A, a silicone release polyethylene terephthalate (PET) film was peeled off and the release film layer was wound. And, a wound substrate-free transfer tape was produced by aging the release film layer in an oven at 50° C. for 48 hours.

Comparative Example 3

A resin composition having a weight average molecular weight of about 1,500,000, a degree of dispersion of 7.08, and a solid content of 15 wt % was produced by solution-polymerizing 11.1 parts by weight of acrylic acid based on 100 parts by weight of 2-ethylhexyl acrylate, in a 1 L glass reactor. After 0.01 part by weight of an aziridine-based crosslinking agent was put into 100 parts by weight of the produced resin composition and the resulting mixture was sufficiently stirred, a transfer film layer having a thickness of 50 μm was produced by coating the mixture onto a silicone release polyethylene terephthalate (PET) film, and then drying the coated film in an oven at 100° C. for 3 minutes.

Furthermore, after the produced transfer film layer was laminated onto the heavy peel surface of Release Liner B, the silicone release polyethylene terephthalate (PET) film was peeled off and the transfer film layer was wound. And, a wound substrate-free transfer tape was produced by aging the transfer film layer in an oven at 50° C. for 48 hours.

Comparative Example 4

After a transfer film layer was produced in the same manner as in Comparative Example 3, the transfer film layer was laminated onto Release Liner D, and then a silicone release polyethylene terephthalate (PET) film was peeled off and the transfer film layer was wound. And, a wound substrate-free transfer tape was produced by aging the transfer film layer in an oven at 50° C. for 48 hours.

Comparative Example 5

A resin composition having a weight average molecular weight of about 1,200,000 and a degree of dispersion of 3.21 was produced by solution-polymerizing 28 parts by weight of isobornyl acrylate and 11.1 parts by weight of acrylic acid, based on 100 parts by weight of 2-ethylhexyl acrylate, in a 1 L glass reactor. After 0.01 part by weight of an aziridine-based crosslinking agent was put into 100 parts by weight of the produced resin composition and the resulting mixture was sufficiently stirred, a transfer film layer having a thickness of 50 μm was produced by coating the mixture onto a silicone release polyethylene terephthalate (PET) film, and then drying the coated film in an oven at 100° C. for 3 minutes.

Furthermore, after the transfer film layer was laminated onto the heavy peel surface of Release Liner B on both surfaces of a paper substrate, the silicone release polyethylene terephthalate (PET) film was peeled off and the transfer film layer was wound. And, a wound substrate-free transfer tape was produced by aging the transfer film layer in an oven at 50° C. for 48 hours.

Comparative Example 6

A transfer film layer was produced in the same manner as in Example 1, except that the thickness of the transfer film layer was adjusted to 100 μm. Furthermore, after the transfer film layer was laminated onto Release Liner A, a silicone release polyethylene terephthalate (PET) film was peeled off and the transfer film layer was wound. And, a wound substrate-free transfer tape was produced by aging the transfer film layer in an oven at 50° C. for 48 hours.

[Experimental Example 1] Measurement of Release Peel Force

In order to measure release peel force between the release liner and the transfer film layer in each of the substrate-free transfer tapes according to Examples 1 to 4 and Comparative Examples 1 to 6 and, an experiment was performed as follows.

A substrate-free transfer tape sample with a width of 60 mm×a length of 150 mm was prepared, and only a 100 mm length of the transfer film layer was allowed to touch a SUS surface and then attached to the SUS surface by using and reciprocating a roller with a load of 2 kg twice at a rate of 10 mm/sec. After about a half of the release liner at one end was peeled off and fixed to a jig, force when the release liner was peeled off was measured by peeling off the release liner from a surface to be attached at an angle of 180 degrees and a rate of 0.3 m/min (or 3.0 m/min) using a TA XT Plus apparatus (manufacturer: Stable Micro Systems), thereby measuring the release peel force between the transfer film layer and each of the heavy peel surface and the light peel surface of the release liner.

The following Table 2 shows the release peel force between the transfer film layer and the release liner with respect to each of Examples 1 to 3 and Comparative Examples 1 and 2.

TABLE 2

|  |  | Measurement rate (m/min) | Release peel force (g/in) |
|---|---|---|---|
| Example 1 | Light peel surface | 0.3 | 10.3 |
|  |  | 3.0 | 18.2 |
|  | Heavy peel surface | 0.3 | 34.9 |
|  |  | 3.0 | 62.7 |
| Example 2 | Light peel surface | 0.3 | 21.1 |
|  |  | 3.0 | 20.9 |
|  | Heavy peel surface | 0.3 | 26.0 |
|  |  | 3.0 | 47.4 |
| Example 3 | Light peel surface | 0.3 | 16.6 |
|  |  | 3.0 | 17.7 |
|  | Heavy peel surface | 0.3 | 21.8 |
|  |  | 3.0 | 40.2 |
| Comparative Example 1 | Light peel surface | 0.3 | 19.4 |
|  |  | 3.0 | 24.5 |
|  | Heavy peel surface | 0.3 | 62.4 |
|  |  | 3.0 | 74.9 |
| Comparative Example 2 | Light peel surface | 0.3 | 16.5 |
|  |  | 3.0 | 18.1 |
|  | Heavy peel surface | 0.3 | 70.6 |
|  |  | 3.0 | 100.2 |

Examples 1 to 3 showed the release resistance force of 70 g/in or less at the time of peeling off the transfer film layer from the heavy peel surface of the release liner at a rate of 3 m/min. In the case of Examples 1 to 3, the release peel force between the release liner and the transfer film layer was maintained at a low level, and as a result, when a continuous process was carried out, a problem in that the transfer film layer is lifted up from an adherend did not occur at the time of peeling off the transfer film layer from the release liner after attaching the transfer film layer to the adherend. In contrast, in the case of Comparative Examples 1 and 2, the release peel force between the release liner and the transfer film layer is high, and as a result, a problem in that the transfer film layer is lifted up from an adherend occurred at the time of peeling off the transfer film layer from the release liner after attaching the transfer film layer to the adherend.

Experimental Example 2

Measurement of Transfer Characteristics

In order to measure transfer characteristics of the substrate-free transfer tapes according to Examples 1 to 4 and Comparative Examples 1 to 6, an experiment was performed as follows.

A PET film having a dimension of 300 mm×400 mm and a thickness of 50 μm was fixed onto the bottom surface. And, a substrate-free transfer tape cut into a width of 60 mm and a length of 200 mm was prepared, and then about 70 mm of a surface on one end of an exposed transfer film layer was attached to one end of the PET film. Furthermore, transfer characteristics were evaluated by using a roller with a load of 2 kg to attach the transfer film layer to the PET film and simultaneously remove the release liner. Specifically, the release liner was peeled off by 50 mm from the attached 70 mm area, wound around the rear part of the roller, and held so as to be removable, and then the transfer film layer was peeled off from the release liner were peeled off at a rate, which is the same as the attaching rate, by rolling the roller such that the transfer film layer and the release liner are simultaneously attached and removed at a rate of 5 m/min. The case where the transfer film layer was transferred to the PET film surface was evaluated as ○, and the case where the transfer film layer remained in the release liner without being attached to the PET film was evaluated as x.

A continuous process could be performed on the substrate-free transfer tape of which the transfer characteristics were evaluated as ○, and the continuous process could not be performed on the substrate-free transfer tape of which the transfer characteristics were evaluated as x because the transfer film layer was not transferred to the adherend.

Measurement of Initial Release Resistance Force

Furthermore, in order to measure the initial release resistance force of the transfer film layer, an experiment was carried out as follows.

A substrate-free transfer tape sample with a width of 60 mm×a length of 150 mm was prepared. And, only a 100 mm length of the transfer film layer was allowed to touch a SUS surface and then attached to the SUS surface by using and reciprocating a roller with a load of 2 kg twice at a rate of 10 mm/sec. Furthermore, the substrate-free transfer tape was tensioned at an angle of 90 degrees and a rate of 2.4 m/min with respect to the surface to be attached by using a TA XT Plus apparatus (manufacturer: Stable Micro Systems), and the initial release resistance force was measured by measuring force when the transfer film layer began to be stretched.

The following Table 3 shows the transfer characteristics and the initial release resistance force of the release film layers with respect to the substrate-free transfer tapes according to Examples 1 to 4 and Comparative Examples 1 to 6. The transfer characteristics and the initial release resistance force according to Table 3 were measured as follows.

Further, FIG. 2 is a graph obtained by measuring the initial release resistance force of the substrate-free transfer tapes according to Example 1 and Comparative Example 1. Specifically, the maximum peak value in FIG. 2 means force (force when the transfer film layer begins to be stretched) by which the heavy peel surface of the release liner and the transfer film layer begin to be separated, and can be considered as the initial release resistance force. For reference, the value of force measured at the section of about 2.5 mm to about 12.5 mm after the initial peak value in FIG. 2 is a value obtained by measuring the force by which the transfer film layer which is not attached to the adherend is stretched, and the section at which the value of force measured thereafter drops to 0 means that the transfer film layer which is attached to the adherend and the transfer film layer which is not attached to the adherend are cut off.

TABLE 3

|  | Transfer characteristics | Initial release resistance force (g/in) |
|---|---|---|
| Example 1 | ○ | 292 |
| Example 2 | ○ | 500 |
| Example 3 | ○ | 354 |
| Example 4 | ○ | 341 |
| Comparative Example 1 | X | 708 |
| Comparative Example 2 | X | 638 |
| Comparative Example 3 | X | 390 |
| Comparative Example 4 | X | 530 |
| Comparative Example 5 | X | 414 |
| Comparative Example 6 | ○ | 629 |

In each of Examples 1 to 4, the release peel force between the transfer film layer and the heavy peel surface of the release liner and the initial release resistance force of the transfer film layer were appropriately adjusted, so that it can be seen that excellent transfer characteristics are implemented. That is, in each of the substrate-free transfer tapes according to Examples 1 to 4, the release liner could be removed without a phenomenon in which the transfer film layer is lifted up from an adhered after attaching the transfer film layer to the adherend during a continuous process, but each of Comparative Examples 1 to 5 showed the transfer characteristics in which the continuous process could not be carried out because the release peel force between the transfer film layer and the release liner and/or the initial release resistance force of the transfer film layer were appropriately adjusted.

Furthermore, in the case of Comparative Example 6 in which the transfer film layer had a thickness of more than 80 μm, the transfer characteristics of the transfer film layer were shown to be good, but there occurred a problem in that the transfer film layer was lifted up from the adherend because the initial release resistance force was extremely high. Further, in the case of Comparative Example 6, there was a problem in that it was difficult to apply the substrate-free transfer tape to a continuous process without a separate cutting process because the breaking distance of the transfer film layer became extremely long.

EXPLANATION OF REFERENCE NUMERALS AND SYMBOLS

100: Release liner
101: Light peel surface
102: Heavy peel surface
200: Transfer film layer
300: Adherend

The invention claimed is:

1. A substrate-free transfer tape comprising:
a release liner comprising a heavy peel surface and a light peel surface; and
a transfer film layer provided on the heavy peel surface,
wherein the transfer film layer is a cured product of a resin composition which is obtained by polymerizing a (meth)acrylate monomer; a cycloalkyl group-containing acrylate monomer; a heterocycloalkyl group-containing acrylate monomer; and a polar functional group-containing monomer,
wherein a content of the cycloalkyl group-containing acrylate monomer is from 10 parts by weight to 40 parts by weight based on 100 parts by weight of the (meth) acrylate monomer,
wherein a content of the heterocycloalkyl group-containing acrylate monomer is from 1 part by weight to 15 parts by weight based on 100 parts by weight of the (meth)acrylate monomer,
wherein a content of the polar functional group-containing monomer is from 1 part by weight to 10 parts by weight based on 100 parts by weight of the (meth) acrylate monomer,
wherein a release peel force between the heavy peel surface and the transfer film layer is from 10 g/in to 70 g/in at a time of peeling off the transfer film layer at a rate of 3 m/min,
wherein an initial release resistance force of the transfer film layer is from 200 g/in to 600 g/in,
wherein release peel force of the heavy peel surface with respect to tesa 7475, which is a reference tape, is from 20 g/in to 50 g/in at a time of peeling off the reference tape at a rate of 3 m/min.

2. The substrate-free transfer tape of claim 1, wherein the resin composition further comprises one or more crosslinking agents selected from the group consisting of an acrylate-based crosslinking agent, an isocyanate-based crosslinking agent, an epoxy-based crosslinking agent, an aziridine-based crosslinking agent, and a metal chelate crosslinking agent.

3. The substrate-free transfer tape of claim 1, wherein the resin composition has a weight average molecular weight of 750,000 g/mol to 3,000,000 g/mol.

4. The substrate-free transfer tape of claim 1, wherein the resin has a degree of dispersion of 5 to 15.

5. The substrate-free transfer tape of claim 1, wherein the transfer film layer has a thickness of 5 μm to 80 μm.

6. The substrate-free transfer tape of claim 1, wherein the substrate-free transfer tape is in a wound form.

7. The substrate-free transfer tape of claim 6, wherein a release peel force between the light peel surface and the transfer film layer is from 10 g/in to 25 g/in at the time of peeling off the transfer film layer at a rate of 3 m/min.

8. The substrate-free transfer tape of claim 1,
wherein the release peel force between the heavy peel surface and the transfer film layer is higher than a release peel force between the light peel surface and the transfer film layer.

* * * * *